United States Patent [19]
Ohue et al.

[11] Patent Number: 4,663,222
[45] Date of Patent: May 5, 1987

[54] NON-WOVEN FABRIC, AND OIL WATER SEPARATING FILTER AND OIL-WATER SEPARATING METHOD

[75] Inventors: Kazuto Ohue, Takatsuki; Toshiyuki Kondou, Ibaraki; Hisaharu Takeuchi, Ibaraki; Yuzo Ikeda, Ibaraki, all of Japan

[73] Assignee: Asahi Kasei Kogyo Kabushiki Kaisha, Japan

[21] Appl. No.: 822,200

[22] Filed: Jan. 24, 1986

[30] Foreign Application Priority Data

Jan. 25, 1985 [JP] Japan .................. 60-11027
Jan. 25, 1985 [JP] Japan .................. 60-11028
May 9, 1985 [JP] Japan .................. 60-96748

[51] Int. Cl.⁴ ............................................. D03D 3/00
[52] U.S. Cl. ................................. 428/224; 428/198; 428/252; 428/253; 428/256; 428/284; 428/285; 428/286; 428/903
[58] Field of Search .............. 428/224, 252, 256, 284, 428/285, 286, 253, 198, 903

[56] References Cited

U.S. PATENT DOCUMENTS 4,042,740 8/1977 Krueger ............................. 418/903
4,089,783 5/1978 Holyoak ............................ 428/256
4,307,143 12/1981 Meitner ............................. 428/171
4,469,734 9/1984 Minto et al. ....................... 428/903
4,496,508 1/1985 Hartmann et al. ................. 428/224
4,536,440 8/1985 Berg ................................... 428/903
4,587,154 5/1986 Hotchkiss et al. ................. 428/171

FOREIGN PATENT DOCUMENTS 0224900 11/1985 Japan .

Primary Examiner—James J. Bell
Attorney, Agent, or Firm—Finnegan, Henderson, Farabow, Garrett & Dunner

[57] ABSTRACT

Disclosed is a water-repellent nonwoven fabric made of a melt-blown fiber having a single filament denier of 0.005 to 2.0, wherein the fiber packing ratio is 5 to 70% and the water pressure resistance index is 400 to 2,000 mmH$_2$O. The nonwoven fabric is used for an oil-water separating filter having a permeability to oil and non-permeability to water. A composite fabric comprising a combination of the nonwoven fabric and an air-permeable knitted or woven fabric laminated and integrated with at least one surface of the nonwoven fabric is useful as an air permeable and water repellent fabric.

15 Claims, 5 Drawing Figures

NON-WOVEN FABRIC, AND OIL WATER SEPARATING FILTER AND OIL-WATER SEPARATING METHOD

BACKGROUND OF THE INVENTION (1) Field of the Invention

The present invention relates to a water-repellent nonwoven fabric prepared by melt-blowing. More particularly, the present invention relates to a nonwoven fabric which has an excellent air permeability and oil permeability, and a non-permeability to water.

The present invention also relates to an oil-water separating filter and an oil-water separating method, using the water-repellent woven fabric.

(2) Description of the Related Art

Most water-proof fabrics are prepared by coating the surface of a woven or knitted fabric with a resin coating. In the fabrics prepared according to this method, in order to maintain sufficient water-proofness, the air permeability must be sacrified. As means for solving this problem, Japanese Unexamined Patent Publication No. 56-26,076 proposes a method for making a moisture permeable coated fabric, in which fine pores having a size of the micron order and being intercommunicating with each other are formed in a coating film formed of a synthetic polymer composed mainly of polyurethane. In this method, however, the number of pores that can be formed in the unit area is limited, and in order to obtain a sufficient water-proofness, the air permeability must be controlled to below 0.5 cc/cm$^2$.sec, and hence, a satisfactory air permeability cannot be obtained.

As the conventional oil-water separating technique, there can be mentioned a gravity separation method, a centrifugal separation method, an oil collecting method, a membrane separation method, a chemical flocculation method, a magnetic separation method, and a droplet-coalescing separation method. However, these methods have problems in that complete separation cannot be attained by a single step and or the separation cost is very high. As one separation method in which separation can be easily accomplished by a single step at a relatively low cost, an ultrafiltration method using a polymeric porous membrane is adopted in various fields. However, since the rate of liquid permeation is low, the amount of the liquid treated per unit time is small, and in order to avoid this disadvantage, the size of the separation apparatus must be increased. A method using a nonwoven fabric filter or filter paper having a high filtration rate is adopted, but this method still has problems in that the separation of an oil is incomplete or clogging readily occurs. Moreover, when a filter paper is used, the pulp is swollen with water to cause a reduction of the strength and a reduction of the permeation rate. As the droplet-coalescing separation method, there is known a method in which a fiber assembly coalescer composed of nylon, rayon, glass, or stainless steel fiber is used for forming coalescent oil droplets. This method exerts a high droplet-coalescing separation effect for relatively large oil droplets (having a diameter larger than 5 μm). However, for fine stable oil droplets having a size of about 0.1 to about 5 μm, or when the oil concentration is too high, coalescing of the oil droplets becomes impossible. Moreover, even for oil droplets having a size larger than 5 μm, it is difficult to form properly coalescent droplets by a single stage of the coalescer, and therefore, a plurality of stages of coalescers must be used. As means for solving this problem, Japanese Examined Patent Publication No. 55-45,242 proposes an element composed of an assembly of a fiber having an affinity with fine oil droplets, in which the void ratio is reduced to coarsen the fine droplets. However, even according to this proposal, it is difficult to form properly coalescent and separate ultrafine stable oil droplets having a size of about 0.1 to about 1 μm, and since the void ratio is small, the amount of the liquid treated per unit area is small.

Water diffused from the human body ordinarily includes water evaporated from the human body and sweat formed for adjusting the body temperature during motion. The rate of the former evaporation is 350 to 600 g/m$^2$.24 hours at a comfortable temperature in the quiet state, and upon violent motion, the rate of the latter evaporation is said to be 2,500 g/m$^2$.24 hours. A cloth, diaper or shoe formed of the conventional water-proof fabric inhibits diffusion of water from the body to the outside of the fabric, as pointed out hereinbefore, and the humidity is increased within the fabric to impart a stuffy, and unpleasant feeling. In the conventional moisture-permeable water-proof fabric, the water-proofness of at least 600 mmH$_2$O as expressed as the water pressure resistance and the moisture permeability of at least 5,000 g/m$^2$.24 hours are simultaneously attained, but a sufficient air permeability, that is, an air permeability of at least 1.0 cc/cm$^2$.sec, is not attained. Ordinarily, the air permeability is incorrectly regarded as the same property as the moisture permeability, but the levels required for both properties are vastly different and the two properties should be clearly discriminated from each other. The moisture permeation rate of 5,000 g/m$^2$.24 hours is converted to a molecule flow rate of $3.215 \times 10^{-7}$ mole/cm$^2$.sec, and the air permeation rate of 1.0 cc/cm$^2$.sec is converted to a molecule flow rate of $4.16 \times 10^{-5}$ mole/cm$^2$.sec. When these values and the conditions for measuring the moisture permeation rate and air permeation rate are substituted in the Hagen-Poiseuille equation determining the permeation coefficient, it is found that a permeation coefficient of $1.313 \times 10^{-9}$ cm is necessary for attaining the moisture permeation rate of 5,000 g/m$^2$.24 hours, and a permeation coefficient of $5.766 \times 10^{-7}$ cm is necessary for attaining the air permeation rate of 1.0 cc/cm$^2$.sec (examples of the calculation of the permeation coefficient will be described hereinafter). Accordingly, it is seen that the required level of air permeability is 439 times as high as the required level of moisture permeability. Therefore, if the air permeability is sufficient, the level of the moisture permeability is more than 439 times as high as the level of the conventional water-proof fabric, and it is considered that a fabric satisfying this requirement is comfortable and does not give a stuffy feeling because diffused water is sufficiently discharged outside the fabric. In the case of clothing, especially a diaper, a sufficient water-proofness should be attained under compression by the body weight of a baby, and the water pressure resistance index should be ordinarily 300 to 400 mmH$_2$O.

SUMMARY OF THE INVENTION

In view of the foregoing, it is an object of the present invention to solve the foregoing technical problems and to provide a composite fabric having a balanced air permeability and water-proofness, an oil-water separating filter by which an oil is separated from a liquid which is phase-separated from the oil, at a high separation precision and a high separation speed, by selective permeation of the oil, and a method in which ultra-fine oil droplets dispersed in a liquid which is phase-separated from the oil are coarsened and separated from this liquid.

Another object of the present invention to provide a nonwoven fabric which has a sufficient air permeability (i.e., an air permeation rate of at least 1.0 cc/cm$^2$.sec) and a sufficient water-proofness (i.e., a water pressure resistance index of at least 400 mmH$_2$O), the simultaneous attainment of which has been difficult according to conventional techniques.

In one aspect of the present invention, there is provided a water-repellent nonwoven fabric comprising a melt-blown fiber having a single filament denier of 0.005 to 2.0, wherein the fiber packing ratio is 5 to 70% and the water pressure resistance index is 400 to 2,000 mmH$_2$O.

In another aspect of the present invention, there is provided an oil-water separating filter having a permeability to oil and a non-permeability to water, which comprises the above-mentioned water-repellent nonwoven fabric and an optional liquid-permeable sheet laminated on at least one surface of the nonwoven fabric.

In still another aspect of the present invention, there is provided a method for separating an oil from an oil-containing liquid, which comprises passing the oil-containing liquid through an oil-water separating filter as mentioned above under a pressure loss higher than the water pressure resistance index of said nonwoven fabric to form coalescent fine oil droplets and separate the coalescent oil droplets.

In still another aspect of the present invention, there is provided a composite fabric comprising a water-repellent nonwoven fabric as mentioned above and an air-permeable knitted or woven fabric laminated and integrated with at least one surface of said nonwoven fabric.

DESCRIPTION OF THE PREFERRED EMBODIMENTS

Figure 1:
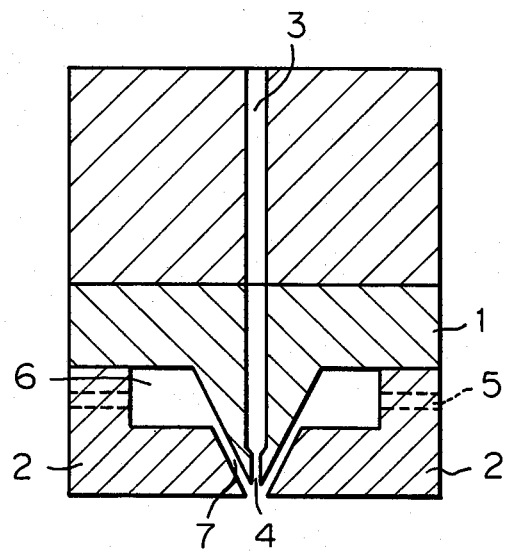
FIG. 1 is a cross-sectional view of a melt blow-spinning head used for the preparation of the non-woven fabric of the present invention.

The determination of the permeation coefficients and other characteristics will now be described.

The permeation coefficient is represented by the following equation:

$$P = \frac{8q\eta Rt}{P_1^2 - P_2^2}$$

wherein P stands for the permeation coefficient (cm), q stands for the molecule flow rate (mole/cm$^2$.sec), $\eta$ stands for the viscosity (poise) of the molecule, R stands for the gas constant (cm$^2$.dyne/cm$^2$.K.mole), T stands for the temperature (K.), p$_1$ stands for the partial pressure (dyne/cm$^2$) of the molecule on the high pressure side, and p$_2$ stands for the partial pressure (dyne/cm$^2$) of the molecule on the low pressure side.

(1) Permeation coefficient (Pair) to air

The air permeation coefficient of a nonwoven fabric having an air permeation rate of 1.0 cc/cm$^2$.sec is determined. Under the measurement conditions, the viscosity $\eta$ of the molecule is $1.800 \times 10^{-4}$ poise, the temperature T is 293 K., the partial pressure p$_1$ of the molecule on the high pressure side is $1.0133 \times 10^6$ dyne/cm$^2$, and the partial pressure p$_2$ of the molecule on the low pressure side is $1.0121 \times 10^6$ dyne/cm$^2$. The air permeation rate of 1.0 cc/cm$^2$.sec is converted to the molecule flow rate of $4.16 \times 10^{-5}$ mole/cm$^2$.sec ($=1.0 \times 273/22.4 \times 10^3 293$). When these values are substituted in the equation of $P = 8q\eta RT(p_1^2 - p_2^2)$, the value P of $5.766 \times 10^{-7}$ cm is obtained. The value of $8.314 \times 10^7$ cm$^2$.dyne/cm$^2$.K.mole is used as the gas constant R for the calculation.

(2) Permeation coefficient (Pvapor) to water vapor

The permeation coefficient of a fabric having a moisture permeation of 5,000 g/m$^2$.24 hours is determined. Under the measurement conditions, the viscosity $\eta$ of the molecule is $1.068 \times 10^{-4}$ poise, the temperature K. is 313, the partial pressure p$_1$ of the molecule on the high pressure side is $7.377 \times 10^4$ dyne/cm$^2$, and the partial pressure p$_2$ of the molecule on the low pressure side is 0 dyne/cm$^2$. The moisture permeation rate of 5,000 g/m$^2$.24 hours is converted to the molecule flow rate of $3.215 \times 10^{-7}$ ($=5,000/18 \times 10^4 \times 24 \times 60^2$). When these values are substituted in the equation determining the permeation P, the value P of $1.313 \times 10^{-9}$ cm is obtained.

The air permeability is determined by using a fragile type tester according to the method of JIS L-1096-1979, and the moisture permeability is determined according to the method of ASTM E96-66BW.

The nonwoven fabric of the present invention is composed of a melt-blown fiber. A nonwoven fabric formed by the melt-blowing method is characterized in that the nonwoven fabric can be composed of an ultra-fine and uniform fiber, has a uniform basis weight and thickness and is soft, and further that almost no polymer pilling nor the formation of pinholes occurs. The nonwoven fabric of the present invention is formed by extruding a fiber-forming thermoplastic resin or a mixture thereof through a heated nozzle in the molten state into a hot gas stream, attenuating the molten resin into a fine fiber stream, and collecting the formed fine fiber in a receiver arranged in a fiber stream passage. The basic method and apparatus for the melt-blowing operation are disclosed in Industrial and Engineering Chemistry, 48, No. 8, pages 1342-1346 (1959). As the thermoplastic resin, there may be used polyamides such as poly(hexamethylene adipamide) and poly($\omega$-capramide), polyesters such as poly(methyl methacrylate), poly(ethylene terephthalate), and poly(butylene terephthalate), vinyl polymers such as polystyrene, polymers of olefins having 3 to 8 carbon atoms, high-density polyethylene, and mixtures thereof. Any mixture of two or more of the foregoing resins can be used.

The single filament denier of the melt-blow-spun fiber is 0.005 to 2.0, preferably 0.005 to 1.0, and more preferably 0.01 to 0.5. If the single filament denier is less than 0.005, industrial production of a uniform product is difficult, and polymer pills and shots are readily formed. Furthermore, the fiber strength is poor and the handling property at the subsequent steps is degraded. If the single filament denier exceeds 2.0, the air permeability is increased but the water-proofness is insufficient (the product is not suitable for use where a good water-proofness is required). Furthermore, the permeation to droplets dispersed in oil-containing water is increased to reduce the separation precision, the capacity of catching and destroying fine droplets is insufficient, and a satisfactory droplet-coalescing effect cannot be obtained. In the case where large quantities of polymer pills and shots are formed in the nonwoven fabric, the water-proofness and oil-water separating performance are degraded. Accordingly, it is important that melt-blow spinning should be carried out under conditions such that these defects are not produced.

In the nonwoven fabric of the present invention, the fiber packing ratio is 5 to 70%. The fiber packing ratio is represented by the following formula:

Fiber packing ratio (%) =

$$\frac{\text{apparent density of nonwoven fabric}}{\text{true density of fiber}} \times 100$$

In order to obtain the well-balanced air-permeability (at least 1.0 cc/cm².sec) and water-proofness (water pressure resistance index of at least 400 mmH$_2$O) intended in the present invention, the fiber packing ratio should be in the range of from 5 to 30%. If the fiber packing ratio is lower than 5%, voids among filaments are increased and a satisfactory water-proofing (water pressure resistance index of at least 400 mmH$_2$O) cannot be obtained, and furthermore, the shape-retaining property is bad and the handling property at the subsequent step is degraded. If the fiber packing ratio is higher than 30%, a satisfactory air permeability (at least 1 cc/cm².sec) cannot be obtained. When a nonwoven fabric having too high a fiber packing ratio is used for clothing, the feel is hard and the commercial value is reduced. When the nonwoven fabric is used for an oil-water separating filter or a droplet-coalescing separating filter, the fiber packing ratio should be in the range of from 10 to 50%. If the fiber packing ratio is lower than 10%, liquid droplets in the phase-separated state from dispersed oil droplets permeate the nonwoven fabric as well as the oil droplets, and the precision of separation of the liquid droplets is lowered. In connection with the coalescing performance, ultra-fine oil droplets are not caught in voids among filaments but permeate the nonwoven fabric. Moreover, the fiber packing ratio is increased by exhaustion of the nonwoven fabric while the separation is carried out, and the liquid permeability is changed during the separation. If the fiber packing ratio is higher than 50%, a liquid permeability that is industrially adoptable cannot be obtained. It is preferred that the fiber packing ratio be in the range of from 15 to 40%.

In order to obtain a water repellency corresponding to a water pressure resistance index of 400 to 2,000 mmH$_2$O intended in the present invention, a nonwoven fabric having a single filament denier of 0.005 to 2.0 and a fiber packing ratio of 5 to 70%, which is formed by melt-blowing, is subjected to a water-repellent and oil-repellent treatment. Known water repellents and oil repellents can be used. For example, there may be used hydrocarbon compounds, long-chain aliphatic pyridinium compounds, methylolated fatty acid amides, and pyridinium chloride salts thereof, Werner chromium complexes having an aliphatic alkyl group, and silicone compounds such as methylhydrodiene polysiloxanes and dimethylpolysiloxanes. Furthermore, perfluoroalkyl compounds such as homopolymers and copolymers of monomers represented by the following formulae:

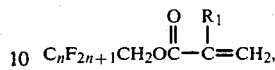

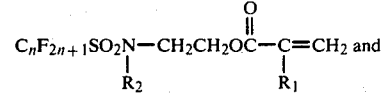

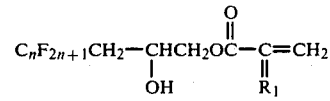

wherein R$_1$ stands for a hydrogen atom or a methyl group, R$_2$ stands for a methyl group or an ethyl group, and n is an integer of from 3 to 21, may be used.

Customary methods such as padding, dipping, absorption, and spray methods may be adopted for applying these water repellents and oil repellents to the nonwoven fabric. These repellents are commercially available in the form of emulsions, and these emulsions are ordinarily diluted before application to the nonwoven fabric. If the water- and oil-repellent is applied in an amount of about 1 to about 10% by weight based on the fiber, a sufficient water repellency can be obtained. After application of the water- and oil-repellent, the nonwoven fabric is heat-treated at a high temperature to promote the fixation of the water- and oil-repellent to the fiber, the crosslinking of the water- and oil-repellent, and the orientation of —CH$_3$ and CF$_3$ groups on the fiber surface. The temperature and time of the heat treatment may be appropriately determined according to the kinds of water- and oil-repellent and the fiber. For example, when a fluorine type water- and oil-repellent is applied to a polyester fiber, if the heat treatment is carried out at 180° C. for about 1 minute, a washing-resistant water repellency can be obtained. The water-repellent and oil-repellent treatment may be carried out in the pre-pressed state after melt-blowing or after the pressing treatment, or after the relaxing treatment in a liquid, which is conducted subsequently to the pre-pressing treatment. Moreover, the water-repellent and oil-repellent treatment may be carried out after lamination and integration of the nonwoven fabric. Of course, applicable methods are not limited to those mentioned above, but an appropriate method may be selected according to the intended use.

In the nonwoven fabric of the present invention, the water pressure resistance index is in the range of from 400 to 2,000 mmH$_2$O. If the water pressure resistance index is smaller than 400 mmH$_2$O, the water-proofness is insufficient for a fabric for which a good water-proofness is required. For example, for a diaper, the water pressure resistance index should be 300 to 400 mmH$_2$O, and if the water pressure resistance index is lower, leakage will probably occur. When a nonwoven fabric having a small water pressure resistance index is used for an oil-water separating filter, if an oil-containing liquid which is phase-separated from the oil is continuously passed through the filter, clogging is caused by liquid droplets or dust and a pressure loss is caused before and after the filter, and if the pressure loss exceeds the water pressure resistance index, water permeates the filter and the oil-water separation performance cannot be attained. (Note, in the case of a phase-separated liquid containing fine oil droplets, the fine oil droplets are formed into coalescent droplets and separation of the system into two layers is caused.) When the water pressure resistance index is small and less than 400 mmH$_2$O, industrial filtration is difficult because the total filtration quantity for which a high separation precision is expected is small or the filtration time is too long. A water pressure resistance index larger than 2,000 mmH$_2$O cannot be hardly attained if the single filament denier and the fiber packing ratio are within the ranges specified in the present invention.

An embodiment where the nonwoven fabric of the present invention is used for an oil-water separating filter will now be described.

By the term "oil" used in the present invention is meant an oil having a surface tension of not larger than 55 dyne/cm, and in the case of an oil having a surface tension of not larger than 40 dyne/cm, the separation efficiency is especially enhanced. As typical instances of the oil, there can be mentioned paraffinic hydrocarbons such as n-pentane, n-hexane, n-octane, and n-decane, halogenated hydrocarbons such as trichloroethylene, trichloroethane, tetrachloroethylene, tetrachloroethane, and 1,1,2-trichloro-1,2,2-trifluoroethane, hydrocarbon mixtures such as petroleum ether, ligroine, gasoline, kerosene, and petroleum naphtha, aromatic hydrocarbons such as benzene, toluene, and xylene, alicyclic hydrocarbons such as cyclopentane and cyclohexane, and various mineral oils, vegetable oils, animal oils, ethers, ketones, esters, alcohols, and phenols.

By the term "liquid phase-separated from the oil" used in the present invention is meant a liquid having a surface tension of at least 60 dyne/cm, and in the case of a liquid having a surface tension of at least 65 dyne/cm, the separation efficiency is further enhanced. As typical instances, there can be mentioned water, glycerol, ethylene glycol, and formamide.

By the term "phase separation from the liquid" is meant that two liquid phases are co-present irrespective of the dispersion state of the two phases. For example, the state of dispersion of one liquid in the other liquid and the presence of two phases separated through an intervening interface are meant. In the present invention, not only the initially phase-separated state but also the phase-separated state newly formed by addition of a solvent or the like to a solution or a multiple-phase system is included in the meaning of the phase-separated state.

The form of the nonwoven fabric as the filter is not particularly critical. Any of a planar membrane-like shape, a cylindrical shape, a fine tube-like shape, a spiral shape and a bellows-like shape may be optionally adopted. A nonwoven fabric having such a shape may be used as it is or after it has been assembled into an element or a cartridge. In order to reinforce the nonwoven fabric, at least one surface of the nonwoven fabric may be laminated with a liquid-permeable sheet. A sheet not reducing the permeability of the nonwoven fabric and having a good dimensional stability resistant to deformation is used as the reinforcing sheet. A mesh structure of a metal or resin or a woven fabric of a synthetic fiber is preferably used as the reinforcing sheet.

In the present invention, the separating method is not particularly critical. A batchwise or continuous filtration method may be adopted. In the case of the continuous method, a longitudinal, lateral, or multi-staged filtration system may be adopted. Furthermore, the permeation method is not particularly critical. For example, there may be adopted a method utilizing gravity, a method in which an oil-containing liquid in the phase-separated state from the oil is compressed under a pressure loss not larger than the water pressure resistance index of the nonwoven fabric and passed through the nonwoven fabric, and a method in which the above-mentioned liquid is passed through the nonwoven fabric at a constant flow rate under a pressure loss not larger than the water pressure resistance index. By the term "coalescing of fine droplets" used in the present invention is meant the phenomenon in which fine oil droplets having a diameter of 0.1 to 50 μm are formed into drops having a diameter larger than 0.1 mm. Coalescent oil drops having a diameter larger than 0.1 mm are readily allowed to rise because of the difference of the specific gravity from the liquid phase-separated from the oil, with the result that the liquid system is divided into two layers. According to the droplet-coalescing separating method of the present invention, a pressure increasing the water pressure resistance index is applied to the nonwoven fabric and a liquid in the state phase-separated from an oil, which contains fine oil droplets, is passed through the nonwoven fabric, whereby the fine oil droplets are formed into coalescent drops in the nonwoven fabric (filter) to separate the liquid into two layers. After this phase separation, the liquid can be easily separated from the oil by the separation utilizing the difference of the specific gravity. Furthermore, the separation can be accomplished by the oil-permeable water-non-permeable filter of the present invention. In the case of an oil which is difficult to convert to coalescent drops if a plurality of the nonwoven fabrics of the present invention are piled and used, coalescing can be facilitated and the liquid can be easily divided into two layers.

In the case where dust is present in the liquid to be separated, clogging is readily caused in the filter of the present invention. Accordingly, a prefilter may be disposed as a dust collector before the filter of the present invention so as to collect dust contained in the liquid to be treated and prolong the life of the filter. A membrane-like or wadding-like dust collector may be used as the pre-filter.

The oil-water separating filter of the present invention may be built in a process for concentrating and recovering one component from a multiple-component system. For example, the final separation of a dispersion (distillate or distillation residue) from a distilling apparatus can be accomplished by adopting the oil-permeable filter instead of the separation means utilizing the difference of the specific gravity. Furthermore, if the separation through the oil-permeable filter or the separation utilizing the difference of the specific gravity is carried out after the coalescing of oil droplets, the concentration and recovery can be at a higher efficiency, and therefore, this method is preferable. For recovery of a solvent adsorbed in active carbon, steam is blown into active carbon to desorb the solvent adsorbed in the active carbon. It is possible to adopt a method in which fine oil droplets formed at this solvent recovery step are made coalescent and separated by the oil-water separating filter of the present invention. Where a solvent recovered by distillation is used again as in a dry cleaning machine or ultrasonic washing machine, the separation method utilizing the difference of the specific gravity is now adopted for the separation of dispersed water after the distillation. In this method, the final separation can be performed at a high precision by the oil-permeable filter of the present invention. Incorporation of water in an airplane jet fuel is a serious problem because it results in the occurrence of accidents. If the oil-permeable filter of the present invention is disposed in a pipe line or an oil-feeding tank truck, water can be separated from the fuel oil at a high precision. Moreover, in the case of bilge water containing heavy oil finely dispersed in sea water, heavy oil in sea water can be separated at a high efficiency by separating bilge water into two layers by the coarsening filter of the present invention and performing the separation by utilizing the difference of the specific gravity.

A composite fabric having a combination of good air permeability and water-proofness, which is formed by using the nonwoven fabric of the present invention, will now be described.

The nonwoven fabric of the present invention is readily deformed by an external pressure applied at the time of washing, resulting in a drastic reduction of the water-proofness. Moreover, if the nonwoven fabric of the present invention is used for clothing as it is, the commercial value is very low. Accordingly, at least one surface of the nonwoven fabric of the present invention is laminated and integrated with an air-permeable knitted or woven fabric to form a composite fabric. An air-permeable knitted or woven fabric having an air permeability such that the air permeability of the resulting composite fabric is at least 1 cc/cm$^2$.sec is used. It is known that if two fabrics having the same air permeability are piled, the air permeability is reduced to about ½. Accordingly, in order to obtain an excellent air permeability as intended in the present invention, it is necessary to use a knitted or woven fabric having an air permeability of at least 2 cc/cm$^2$.sec. Since the strength of the nonwoven fabric of the present invention is low, the nonwoven fabric is damaged when it is actually worn. Accordingly, also in order to reinforce the nonwoven fabric, it is necessary to laminate and integrate the nonwoven fabric with a knitted or woven fabric. The water-proofness is lost when the nonwoven fabric is broken. Accordingly, from the practical viewpoint, in order to prevent the nonwoven fabric from being broken, it is necessary that when the composite fabric is elongated at the elongation at break of the nonwoven fabric, the stress should be at least 2.0 kg/2.5 cm, preferably at least 5.0 kg/2.5 cm. The elongation at break of the nonwoven fabric means the elongation of the nonwoven fabric at which the water pressure resistance of the water repellent- and oil repellent-treated nonwoven fabric begins to decrease, and this value is approximate to the maximum stress value attained when the nonwoven fabric alone is elongated. Namely, in order to obtain a composite fabric having a combination of good air permeability and water-proofness as intended in the present invention, it is indispensable that the stress of the knitted or woven fabric attained when it is elongated at the elongation at break of the nonwoven fabric should be at least the value A (A=2.0 kg/2.5 cm—the maximum stress value attained when the nonwoven fabric is elongated). Accordingly, when the knitted or woven fabric is selected, the elongation and strength at break of the nonwoven fabric are first determined by the elongation test. Based on the obtained value of the elongation, the value A is determined, and a knitted or woven fabric having a stress value of at least the value A is selected. Where the stress value is smaller than the value A, breakage of the nonwoven fabric or reduction of the water pressure resistance is caused while the composite fabric is in practical use. When the maximum value is attained before the value A, the knitted or woven fabric is broken. The value A of the knitted or woven fabric can be increased by decreasing the elongation of the knitted or woven fabric. As means for attaining this increase of the value A, there may be considered a method in which the density is increased, a method in which motion of the texture is controlled by spun yarn-like fluffs, a method in which yarns are inserted into a knitted fabric, and a method in which the elongation is reduced by the finish processing, although the applicable methods are not limited to these methods. The material or basis weight of the knitted fabric or woven fabric may be appropriately selected according to the intended use. It is preferred that a knitted or woven fabric which has been subjected to a water-repellent and oil-repellent treatment be used.

By the term "laminated and integrated fabric" referred to in the present invention is meant a product obtained by laminating at least one surface of the nonwoven fabric with a knitted or woven fabric and bonding them by a high-frequency welder or an ultrasonic welder or by using a sewing thread, a product obtained by applying a hot-melt adhesive to at least one surface of the nonwoven fabric or a knitted or woven fabric and heat-bonding the nonwoven fabric to the knitted or woven fabric, and a product obtained by coating a synthetic resin adhesive on the nonwoven fabric or a knitted or woven fabric and press-bonding the nonwoven fabric to the knitted or woven fabric. Furthermore, the laminated and integrated fabric includes a product obtained by bonding knitted or woven fabrics to both the surfaces of the nonwoven fabric, respectively, and a product obtained by bonding a knitted or woven fabric to one surface of the nonwoven fabric and sewing a knitted or woven fabric to the other surface of the nonwoven fabric with a sewing thread. When the composite fabric of the present invention is used as a clothing material, in view of the touch and the strength, it is preferred that a knitted or woven fabric be bonded to one surface of the nonwoven fabric through a hot-melt adhesive or a synthetic resin adhesive.

When the nonwoven fabric is bonded to the knitted or woven fabric while applying the hot-melt adhesive or the synthetic resin adhesive to the entire surface, the air permeability is lost. Accordingly, partial bonding is necessary, and there is ordinarily adopted a method in which the hot-melt adhesive or the synthetic resin adhesive is scattered or coated in a pattern of dots, lattices or lines. When the hot-melt adhesive or the synthetic resin adhesive is coated in a pattern of dots on the nonwoven fabric or the knitted or woven fabric, it is preferred that the ratio of the area occupied by dots be 10 to 80%. If the area ratio of the dots exceeds 80%, the reduction of the air permeability is extreme and good results cannot be obtained. If the area ratio of the dots is smaller than 10%, the bonding force is weak and peeling is readily caused by washing or dry cleaning. The size of each dot is ordinarily about 0.2 to abut 1.5 mm, and the dot density is adjusted to 5 to 50 points per inch so that the area ratio of the dots is 10 to 80%.

As the hot-melt adhesive, there can be mentioned polyethylene, ethylene copolymers, polyamides, polyesters, butyral resins, polyvinyl acetate, vinyl acetate copolymers, cellulose derivatives, polymethyl methacrylate, polyvinyl ether resins, polyurethanes, and polycarbonates. As the synthetic resin adhesive, there can be mentioned addition type polymer adhesives such as olefin polymers, vinyl chloride polymers, vinyl alcohol polymers, vinyl acetate polymers, and acrylic polymers, condensation polymer adhesives such as phenoplast resin adhesives, aminoplast resin adhesives, polyesters, polyamides, polyurethanes, polyethers, epoxy resin adhesives, and silicone resin adhesives, and rubber adhesives and cellulose derivative adhesives.

The hot-melt adhesive is dot-coated on the nonwoven fabric or the knitted fabric by the roll-coating method and bonding is effected at a temperature higher by 10° to 20° C. than the hot-melt adhesive under a pressure of 1 to 3 kg/cm² by using a pressing machine. In the case of the synthetic resin adhesive, there is preferably adopted a method in which the adhesive is coated on a release paper by a gravure coater, the resin is semi-dried, the coated release paper is press-bonded to the knitted or woven fabric, and the nonwoven fabric is press-bonded to the knitted or woven fabric while peeling the release paper from the knitted or woven fabric.

If the touch is hard after lamination and integration of the nonwoven fabric with the knitted or woven fabric, the fabric is softened by a cam fit machine, a tumbler or a washer, whereby a composite fabric having a high commercial value can be obtained.

The present invention will now be described in detail with reference to the following examples.

The methods for determining various properties, adopted in the examples, are as follows.

Washing Test

Test machine: National household washing machine
Bath ratio: 1/50
Amount of sample: 600 g
Detergent: 2 g/l of New Beads (supplied by Kao Soap)
Time: 5 minutes (washing), 10 minutes (rinsing, water overflowing), 10 seconds (dehydration), 10 hours (natural drying)

Air Permeability

The air permeability was determined by using a fragile type tester according to JIS L-1079 (29) (the test method for chemical fiber woven fabrics).

Water Pressure Resistance

The water pressure resistance was determined according to the water pressure resistance test method A of JIS L-1079-(31) (the test method for chemical fiber woven fabrics).

Softness

The softness was measured according to the hand-wringing test method and evaluated according to the following scale.
Class 1: high softness
Class 2: low softness
Class 3: no softness (paper-like)

Water Pressure Resistance Index

The water pressure resistance index was determined by using a water pressure resistance tester according to JIS L-1079.

Water Content

The sample to be measured was placed in a Petri dish having a capacity of 500 ml, and 0.2 ml of ethanol having a known water content was added to 10 ml of the sample and the water content was measured in MKC-3P (supplied by Kyoto Denshi Kogyo) according to the Karl Fischer method. The water content was calculated according to the following formula:

$$\text{Water content (ppm)} = \frac{C - D}{A + B} \times 10^6$$

wherein A stands for the weight (g) of 10 ml of the sample, B stands for the weight (g) of 0.2 ml of ethanol, C stands for the amount (g) of water in the sample and ethanol, and D stands for the amount (g) of water in 0.2 ml of ethanol.

Oil Content

The oil content was determined by using an oil concentration meter (OCMA-220 supplied by Horiba).

Sizes of Fine Water Droplets and Fine Oil Droplets

Sizes of 100 droplets were measured in an optical microscope photograph (1,000 magnifications) and a mean value was calculated.

EXAMPLE 1

A polyethylene terephthalate chip having an intrinsic viscosity of 0.65 was melted in an extruder and fed to a die 1 (see FIG. 1) maintained at 295° C. The melt was extruded through a molten polymer flow path 3 into a high-speed steam stream under conditions shown in Table 1 at a rate of 0.15 g/min/orifice from 1,500 orifices 4 each having a diameter of 0.3 mm, which were arranged in a line at a pitch of 1 mm. Steam was introduced through conduit 5 into a lip gas header 6 and extruded through a slit 7. Thus, a nonwoven fabric comprising filaments having an average single filament denier of 0.003 to 2.2 and having a fiber packing ratio of 24% and a thickness of 0.14 mm was prepared according to the melt-blow method.

TABLE 1

| | Melt-Blow Conditions | | |
|---|---|---|---|
| Sample | Steam Temperature (°C.) | Steam Pressure (kg/cm²) | Average Single Filament Denier |
| A | 370 | 4.0 | 0.003 |
| B | 360 | 3.2 | 0.005 |
| C | 330 | 3.0 | 0.03 |
| D | 330 | 2.0 | 0.12 |
| E | 320 | 1.7 | 0.69 |
| F | 320 | 1.2 | 1.0 |
| G | 320 | 0.9 | 1.3 |
| H | 310 | 0.7 | 2.2 |

The foregoing eight nonwoven fabrics were subjected to a water-repellent treatment under conditions shown below.

Water-Repellent Treatment Conditions:
The nonwoven fabric was dipped in a mixed aqueous solution comprising 4% by weight of Polon MR and 4% by weight of a catalyst (supplied by Shinetsu Silicone Co.), and then the liquid was removed. The fabric was dried at 100° C. for 3 minutes and heat-treated at 170° C. for 1 minute.

The average single filament denier, fiber packing ratio, thickness and water pressure resistance index of the treated nonwoven fabric are shown in Table 2.

TABLE 2

| Sample | Average Single Filament Denier | Fiber Packing Ratio (%) | Thickness (mm) | Water Pressure Resistance Index (mmH$_2$O) |
| --- | --- | --- | --- | --- |
| 1 | 0.003 | 21 | 0.17 | 1170 |
| 2 | 0.005 | 21 | 0.17 | 950 |
| 3 | 0.03 | 21 | 0.17 | 840 |
| 4 | 0.12 | 21 | 0.17 | 610 |
| 5 | 0.69 | 21 | 0.17 | 520 |
| 6 | 1.0 | 21 | 0.17 | 410 |
| 7 | 1.3 | 21 | 0.17 | 300 |
| 8 | 2.2 | 21 | 0.17 | 210 |

Figure 2:
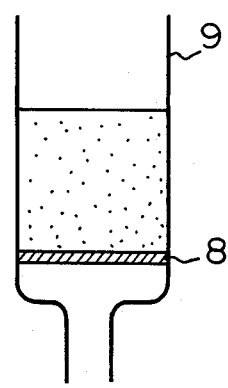
FIG. 2 is a cross-sectional view of an oil-water separation filter having the non-woven fabric of the present invention.

Each 8 of the eight nonwoven fabrics was attached to a filter holder 19 made of glass (the filtration area was 9.6 cm$^2$) as shown in FIG. 2, and a predetermined amount of a liquid to be separated, which was prepared under conditions described below, was passed at a high permeation speed of 200 ml/min (=208 l/min.m$^2$), and the precision of separation of water was examined. The obtained results are shown in Table 3.

Conditions for Preparation of Liquid to Be Separated:

To 50 l of perchloroethylene was added 500 ml of water, and the mixture was heated at 100° C. with stirring. Then, the mixture was rapidly cooled for 10 minutes in a water bath maintained at 25° C. to form an oil-water mixture in which water was dispersed in perchloroethylene. The water concentration in the liquid was 323 ppm and the size of water droplets was 0.5 to 0.7 μm.

TABLE 3

| | Sample | Water Concentration (ppm) in Treated Liquid | |
| --- | --- | --- | --- |
| | | after permeation of 5 l | after permeation of 45 l |
| Comparative Run 1 | 1 | 101 | 100 |
| Run 1 | 2 | 102 | 103 |
| Run 2 | 3 | 103 | 102 |
| Run 3 | 4 | 101 | 105 |
| Run 4 | 5 | 105 | 107 |
| Run 5 | 6 | 110 | 112 |
| Comparative Run 2 | 7 | 275 | 248 |
| Comparative Run 3 | 8 | 313 | 318 |

The saturation solubility of water in perchloroethylene at 25° C. is about 100 ppm. As is apparent from the results shown in Table 3, the nonwoven fabrics of the present invention had a very good precision of separation of dispersed water.

The sample of comparative run 1 had a good precision, but it was difficult to produce a uniform nonwoven fabric on an industrial scale in the case of this comparative run. The head height (mm) at the time of permeation of 45 l was less than 100 mm in each of runs 1 through 5 according to the present invention. Accordingly, it is seen that the nonwoven fabrics of the present invention had such a high treatment capacity as 200 ml/min (208 l/min.m$^2$) with a small pressure loss.

Moreover, it is seen that in the comparative nonwoven fabrics having a water pressure resistance index outside the scope of the present invention, the precision of separation of water was extremely low.

EXAMPLE 2

A nylon 6 chip having a solution viscosity of 2.4 (in sulfuric acid) was melted in an extruder and fed to a die (shown in FIG. 1) maintained at 290° C. The melt was extruded at an extrusion rate of 0.15 g/min/orifice into a high-speed steam stream maintained at a steam temperature of 330° C. and a steam pressure of 3.0 kg/cm$^2$ through 1,500 orifices each having a diameter of 0.3 mm, which were arranged in a line at a pitch of 1 mm, whereby a nonwoven fabric composed of filaments having an average single filament denier of 0.032, which had a fiber packing ratio of 3% and a thickness of 0.1 mm, was prepared according to the melt-blow method.

The nonwoven fabric was heat-pressed by using a pressing machine having upper and lower heatable pressing plates. Thus, seven kinds of nonwoven fabrics having a fiber packing ratio of 3 to 58% were prepared. Namely, the heat-pressing treatment was carried out under a pressure of 1 to 150 kg/cm$^2$, and the temperature and time were adjusted, whereby seven kinds of woven fabrics differing in the fiber packing ratio were prepared.

Several nonwoven fabrics having the same fiber pack ratio were piled to obtain a nonwoven fabric having a thickness of 0.25±0.05 mm.

Seven nonwoven fabrics having a thickness of about 0.25 mm and differing in the fiber packing ratio were subjected to a water-repellent treatment under the following conditions.

Water-Repellent Treatment Conditions:

The nonwoven fabric was immersed in a mixed aqueous solution comprising 4% by weight of Asahi Guard AG-710 (supplied by Asahi Glass Co.), 1% by weight of Eletat (supplied by Ipposha) and 2% by weight of isopropanol, and the liquid was then removed. The fabric was dried at 100° C. for 3 minutes and then heat-treated at 180° C. for 1 minute.

The average single filament denier, fiber pack ratio, thickness and water pressure resistance index of each of the seven treated nonwoven fabrics are shown in Table 4.

| Sample | Average Single Filament Denier | Fiber Packing Ratio (%) | Thickness (mm) | Water Pressure Resistance Index (mmH$_2$O) |
| --- | --- | --- | --- | --- |
| 9 | 0.032 | 4 | 0.25 | 150 |
| 10 | 0.032 | 5 | 0.28 | 180 |
| 11 | 0.032 | 12 | 0.26 | 650 |
| 12 | 0.032 | 23 | 0.23 | 860 |
| 13 | 0.032 | 43 | 0.24 | 1300 |
| 14 | 0.032 | 50 | 0.24 | 1950 |
| 15 | 0.032 | 58 | 0.26 | 2240 |

By using the seven nonwoven fabrics shown in Table 4, a predetermined amount of a liquid to be separated, which was prepared under conditions described below, was passed at a rate of 50 ml/min (156 l/min.m$^2$) through the same separating apparatus as described in Example 1. The precision of separation of water and the liquid permeation speed of the nonwoven fabric were measured.

Conditions for Preparation of Liquid to Be Separated:

To 30 l of 1,1,2-trichloro-1,2,2-trifluoroethane was added 300 ml of water, and the mixture was heated at 40° C. with stirring and rapidly cooled for 10 minutes in a water bath maintained at 25° C. to form an oil-water mixture in which water was dispersed in 1,1,2-trichloro-1,2,2-trifluoroethane. The water concentration in the liquid was 310 ppm and the size of water droplets was 0.5 to 6 μm.

The experimental results are shown in Table 5.

TABLE 5

| Sample | Water Concentration (ppm) in Treated Liquid | | Permeation Rate (l/min m²) of 1,1,2-Tri-chloro-1,2,2-trifluoroethane |
|---|---|---|---|
| | After Permeation of 3 l | After Permeation of 25 l | |
| Comparative Run 4 | 9 | 280 | 270 | Above 6,000 |
| Run 6 | 10 | 180 | 170 | Above 6,000 |
| Run 7 | 11 | 94 | 92 | 4,500 |
| Run 8 | 12 | 91 | 90 | 650 |
| Run 9 | 13 | 93 | 92 | 210 |
| Run 10 | 14 | 90 | 91 | 110 |
| Comparative Run 5 | 15 | 91 | 92 | 30 |

Note

The permeation rate of 1,1,2-trichloro-1,2,2-trifluoroethane was determined by measuring the permeation rate of 1,1,2-trichloro-1,2,2-trifluoroethane at a constant head of 10 cm before the separation test and converting the obtained value to a value of the unit of l/min.m².

The saturation concentration of water in 1,1,2-trichloro-1,2,2-trifluoroethane at 25° C. was about 90 ppm. As is apparent from the results shown in Table 5, the nonwoven fabrics of the present invention showed a high precision of separation of dispersed water and had a high liquid permeability.

It also is seen that the nonwoven fabrics having a water pressure resistance index outside the range specified in the present invention had an extremely low precision of separation of water or an extremely low liquid permeation speed.

EXAMPLE 3

The water-repellent-treated nonwoven fabric of sample 3 of Example 1 was used for separation of a liquid prepared under the following conditions.

Conditions for Preparation of Liquid to Be Separated:

To 100 l of kerosene was added 100 cc of water, and the mixture was stirred for 1 minute by a mixer to obtain an oil-water mixture in which water droplets were dispersed in kerosene. The water concentration in the water droplet-dispersed portion was 250 ppm, and the size of water droplets was 0.5 to 6 μm.

Figure 3:
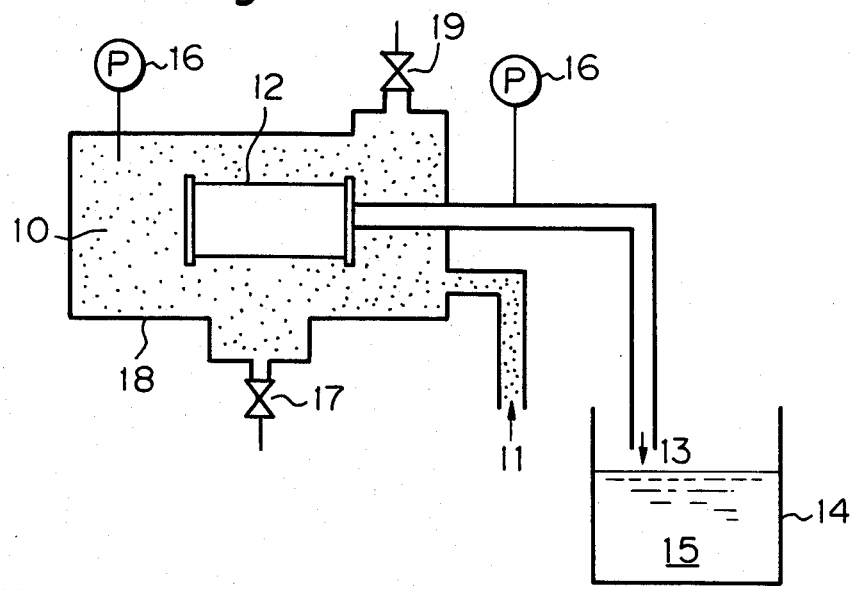
FIG. 3 is a cross-sectional view of an oil-water separation apparatus having a filter made of the non-woven fabric of the present invention.

The outline of the apparatus used for the separation test is shown in FIG. 3.

A predetermined amount of the liquid 10 to be separated was fed at a rate of 1 l/min from an inlet 11 by a liquid feed pump and was separated by an oil-water separating element 12 to which the nonwoven fabric of sample 3 was attached. The liquid (kerosene) 15 permeated through the oil-water separating element 12 came out from an outlet 13 and was stored in a tank 14. A pressure gauge 16 was disposed to measure the pressure loss of the oil-water separating element 12. Reference numeral 17 represents a water trap valve for removing separated water, reference numeral 18 represents a housing (having a capacity of 10 l) for mounting the oil-water separating element 12, and reference numeral 19 represents a valve for removing oil. The filtration area of the nonwoven fabric attached to the oil-water separating element 12 was 500 cm².

The experimental results are shown in Table 6.

TABLE 6

| | Run 11 | | |
|---|---|---|---|
| | After Permeation of 10 l | After Permeation of 30 l | After Permeation of 80 l |
| Water Concentration (ppm) in Permeated Liquid | 5 | 4 | 4 |
| Pressure Loss (kg/cm²) of Oil-Water Separating Filter | 0.002 | 0.003 | 0.003 |

From the results shown in Table 6, it is seen that the oil-water separating filter comprising the nonwoven fabric of the present invention had a low pressure loss and a high water-separating capacity even after permeation of 80 l of the liquid.

EXAMPLE 4

The test of separation of a liquid prepared under conditions described below was carried out by using the same nonwoven fabric and separation apparatus as used in Example 3.

A predetermined amount of the liquid to be separated was fed at a rate of 10 l/min by the liquid feed pump.

Conditions for Preparation of Liquid to Be Separated:

To 500 l of gas oil was added 500 cc of water, and the mixture was circulated through a swirl pump for 10 minutes to obtain an oil-water mixture in which water drops were dispersed in gas oil. The water concentration in the water droplet-dispersed portion was 320 ppm, and the size of the water droplets was 0.5 to 12 μm.

The experimental results are shown in Table 7.

As is apparent from the results shown in Table 7, the oil-water separating filter comprising the nonwoven fabric of the present invention had a low pressure loss and a high water-separating capacity even after permeation of 450 l of the liquid.

TABLE 7

| | Run 12 | | | | |
|---|---|---|---|---|---|
| | After Permeation of 50 l | After Permeation of 100 l | After Permeation of 200 l | After Permeation of 300 l | After Permeation of 450 l |
| Water Concentration (ppm) of Permeated Liquid | 5 | 5 | 3 | 4 | 3 |
| Pressure Loss (kg/cm²) of Oil-Water Separating Filter | 0.01 | 0.02 | 0.02 | 0.03 | 0.04 |

EXAMPLE 5

The test of separation of a liquid prepared under the following conditions was carried out by using nonwoven fabric of sample 12 of Example 2. A predetermined amount of the liquid was fed at a rate of 2 l/min.

Conditions for Preparation of Liquid to Be Separated:

To 100 l of n-hexane was added 100 cc of water, and the mixture was stirred for 10 minutes by a mixer to obtain an oil-water mixture in which water droplets were dispersed in n-hexane. The water concentration in the water droplet-dispersed portion was 280 ppm, and the size of the water droplets was 0.5 to 6 $\mu$m.

The same apparatus as used in Example 3 was used at the separation test. The obtained results are shown in Table 8.

As is apparent from the results shown in Table 8, the oil-water separating filter comprising the nonwoven fabric of the present invention had a low pressure loss and a high water-separating capacity even after permeation of 80 l of the liquid.

TABLE 8

| | Run 13 | | |
|---|---|---|---|
| | After Permeation of 10 l | After Permeation of 50 l | After Permeation of 80 l |
| Water Concentration (ppm) in Permeated Liquid | 5 | 4 | 3 |
| Pressure Loss (kg/cm$^2$) of Oil-Water Separating Filter | 0.03 | 0.04 | 0.04 |

EXAMPLE 6

Figure 4:
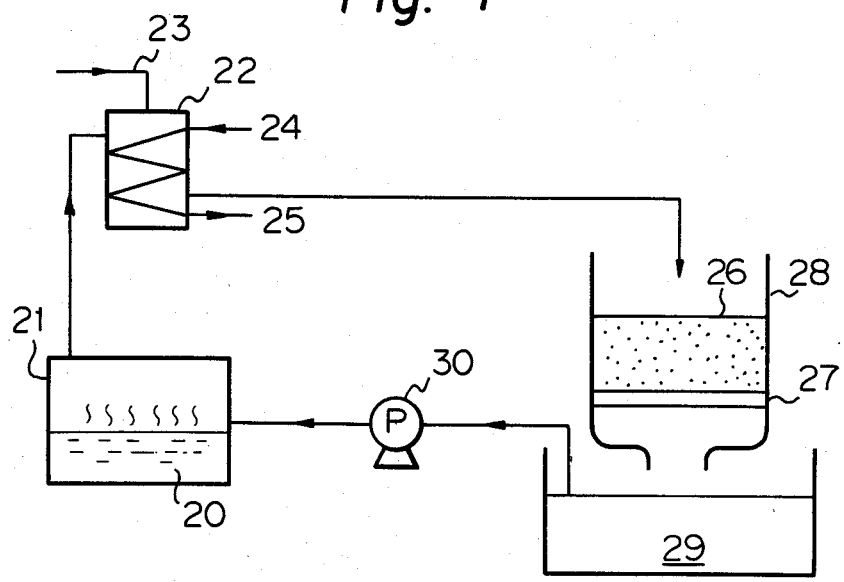
FIG. 4 is a cross-sectional view of another oil-water separation apparatus having a filter made of the non-woven fabric of the present invention.

The durability of an oil-water separating filter was tested by using a separating apparatus as shown in FIG. 4.

Perchloroethylene 20 was charged in a distilling device 21 provided with a steam heater, and distillation was carried out. Steam was blown at a rate of about 40 g/min into the condensing step of a cooler 22 through a steam pipe 23 to prepare a liquid 26 to be separated, in which water droplets were dispersed in perchloroethylene. In the cooler 22, cooling water introduced from 24 and withdrawn to 25. The water concentration in the liquid 26 was 320 ppm, and the size of the water droplets was 0.3 to 12 $\mu$m. The liquid 26 was separated in an oil-water separating filter 27 in a filter holder 28. The permeated liquid 29 (perchloroethylene) after the separation was continuously returned to the distilling device 21 by a pump 30.

Three oil-water separating filters shown in Table 9 were used for the separation test.

TABLE 9

| Sample | Filter |
|---|---|
| 3 | Water-repellent-treated nonwoven fabric of sample 3 of Example 1, not reinforced by any reinforcing member |
| 16 | One surface of above sample 3 reinforced by a polyethylene terephthalate screen (60 mesh/2.54 cm, line diameter = 150 $\mu$m, thickness = 340 $\mu$m) by sewing the end faces together |
| 17 | One surface of above sample 3 reinforced by a stainless steel screen (60 mesh/2.54 cm, line diameter = 193 $\mu$m, thickness = 415 $\mu$m) by piling the nonwoven fabric and the screen together |

At the durability test using the apparatus shown in FIG. 4, the liquid to be separated was fed at a constant rate of 1 l/min, and the filtration area of the oil-water separating filter was 176 cm$^2$. Each of the oil-water separating filters of samples 16 and 17 shown in Table 9 was attached so that the reinforcing screen was located on the lower side.

The permeation test was continuously conducted for 30 hours, and changes of the water-separating capacity and the pressure loss (head height) were examined. The obtained results are shown in Table 10.

In the case of the non-reinforced oil-water separative filter of sample 3 (comparative run 6), after 30 hours' continuous permeation, the central portion of the filter was broken and the oil-water separating capacity was drastically reduced.

On the other hand, in the case of the oil-water separating filters of samples 16 and 17 according to the present invention, no breakage was observed even after 30 hours' continuous permeation and the oil-water separating capacity was very good. Moreover, the pressure loss after 30 hours' permeation was only 70 mm-Perclene. Accordingly, it was confirmed that these films could be satisfactorily used on an industrial scale.

TABLE 10

| Sample | | After 1 Hour | After 3 Hours | After 5 Hours | After 10 Hours | After 12 Hours | After 20 Hours | After 30 Hours |
|---|---|---|---|---|---|---|---|---|
| 3 (Comparative Run 6) | Water Concentration (ppm) in Permeated Liquid | 105 | 107 | 102 | 101 | 104 | 103 | 290 |
| | Pressure Loss (mm-Perclene) | 30 | 51 | 63 | 65 | 68 | 75 | 0 |
| 16 (Run 14) | Water Concentration (ppm) in Permeated Liquid | 101 | 103 | 105 | 102 | 104 | 110 | 104 |
| | Pressure Loss (mm-Perclene) | 32 | 55 | 65 | 62 | 68 | 70 | 70 |
| 17 (Run 15) | Water Concentration (ppm) in Permeated Liquid | 105 | 112 | 108 | 109 | 104 | 103 | 101 |
| | Pressure Loss (mm-Perclene) | 35 | 54 | 62 | 65 | 69 | 72 | 70 |

Note
The pressure loss was determined by measuring the distance (mm) between the top face of the oil-water separating filter and the top face of the liquid to be separated by using a measuring rod.

EXAMPLE 7

Figure 5:
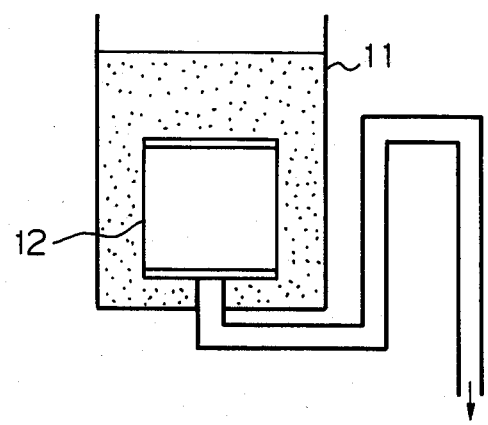
FIG. 5 is a cross-sectional view of still another oil-water separation apparatus having a filter made of the non-woven fabric of the present invention.

The portion of the filter holder 28 of the apparatus shown in FIG. 4 was modified as shown in FIG. 5, and the test of the durability of the oil-water separating filter was carried out in the same manner under the same conditions as described in Example 6. The filtration area of the oil-water separating filter-attached element 12 in the filter holder 11 was 200 cm$^2$. The specification of the oil-water separating filter attached to the element 12 is shown in Table 11.

TABLE 11

| Sample | Filter |
|---|---|
| 18 | Both surfaces of the above sample 11 were reinforced with nylon 6 screen (20 mesh/2.54 cm, line diameter = 287 μm, thickness = 537 μm) by piling |

In the element to which the filter of sample 18 was attached, no breakage of the filter was observed after 50 hours, and it was confirmed that the filter had a good oil-water separating capacity.

EXAMPLE 8

Ten sheets of nonwoven fabrics of sample 4 of Example 1 were piled and attached to a membrane filter holder (supplied by Millipore Co.) (filtration area=11.6 cm$^2$) [the lower side of the nonwoven fabric was reinforced by a stainless steel screen (100 mesh/inch, wire diameter=101 μm, thickness=22.5 μm)]. A liquid 1 or 2 prepared under conditions described below was fed under a pressure of 1.0 kg/cm$^2$. When 10 sheets of nonwoven fabrics of sample 4 were piled, the water pressure resistance index was 1,850 mmH$_2$O (=0.185 kg/cm$^2$).

Liquid 1 to Be Separated:

To 100 l of water was added 100 cc of heavy oil B, and the mixture was stirred for about 10 minutes by a mixer to form an oil-water mixture in which droplets of heavy oil B were dispered in water. The oil concentration in the oil droplet-dispersed portion was 280 ppm, and the size of the oil droplets was 0.5 to 1.5 μm.

Liquid 2 to Be Separated:

The same oil-water mixture as described above was stirred for 10 seconds by a mixer. The oil concentration was 210 ppm, and the size of the oil droplets was 2 to 5 μm.

The results of the oil-coarsening separation test are shown in Table 12.

TABLE 12

| | After Permeation of 10 l | After Permeation of 50 l | After Permeation of 80 l |
|---|---|---|---|
| Run 16, Liquid 1 | | | |
| Oil concentration* (ppm) after oil-coarsening separation | 4 | 3 | 3 |
| Permeation rate** (l/min · m$^2$) | 1,400 | 1,250 | 1,150 |
| Run 17, Liquid 17 | | | |
| Oil concentration (ppm) after oil-coarsening separation | 3 | 4 | 4 |
| Permeation rate (l/min · m$^2$) | 1,450 | 1,200 | 1,100 |

Note
*The oil concentration in the water phase was measured after the permeated liquid was allowed to stand for 5 minutes.
**The amount of the liquid permeated for 1 minute was measured by a graduated cylinder and the measured value was converted to a value of the unit of l per m$^2$ per minute.

As is apparent from the results shown in Table 12, according to the oil-coarsening separation method using the nonwoven fabric of the present invention, even fine oil droplets could be coarsened and separated at a high permeation rate.

When the permeated liquid after the treatment was taken in a graduated cylinder and observed with the naked eye, it was seen that coalescent oil droplets having a size of 0.5 to 2 mm rose in the water phase and the liquid was promptly separated into a transparent water phase and an oil phase.

EXAMPLE 9

Ten sheets of nonwoven fabrics of sample 3 of Example 1 were piled and attached to the same test apparatus as used in Example 8, and a liquid prepared under conditions described below was fed under a pressure of 2.0 kg/cm$^2$ to effect the oil-coalescing separation. When ten sheets of the nonwoven fabrics of sample 3 were piled, the water pressure resistance index was 3,050 mmH$_2$O (=0.305 kg/cm$^2$).

Liquid to Be Separated:

To 100 l of distilled water was added 50 cc of a machine oil (Nisseki Super Hiland 22, NS 206 supplied by Nippon Yushi), and the mixture was stirred for about 30 minutes by a mixer to form an oil/water mixture in which oil droplets of Super Hiland were dispersed in water.

The oil concentration in the oil drop-dispersed phase was 350 ppm, and the size of the oil droplets was 0.5 to 2.0 μm.

The obtained results are shown in Table 13.

TABLE 13

| | After Permeation of 10 l | After Permeation of 30 l | After Permeation of 80 l |
|---|---|---|---|
| Run 18 | | | |
| Oil concentration* (ppm) after oil-coarsening separation | 4 | 3 | 4 |
| Permetion rate** (l/min · m$^2$) | 2,700 | 2,600 | 2,500 |

Note
*, **The measurements were carried out in the same manner as described in Example 8.

As is apparent from the results shown in Table 13, according to the oil-coalescing separation method using the nonwoven fabric of the present invention, the coalescing separation could be accomplished at a high precision and a high permeation rate.

EXAMPLE 10

Ten sheets of nonwoven fabrics of sample 11 of Example 2 were piled and attached to the oil-water separating element used in Example 3 (the filtration area was 50 cm$^2$). Both the sides of the nonwoven fabric assembly attached to the element were reinforced by a stainless steel screen (100 mesh/2.54 cm, wire diameter=101 μm, thickness=225 μm). A liquid prepared under conditions described below was subjected to the separation test.

Liquid to Be Separated:

To 100 μ of water was added 100 cc of kerosene, and the mixture was stirred for about 10 minutes by a mixer to form an oil-water mixture in which oil droplets of kerosene were dispersed in water. The oil concentration in the oil-dispersed portion was 350 ppm and the size of the oil droplets was 0.5 to 2 μm.

When five sheets of the nonwoven fabrics of sample 11 were piled, the water pressure resistance index was 1,820 mmH$_2$O (=0.182 kg/cm$^2$).

By using the apparatus shown in FIG. 3, which was used in Example 3, the liquid to be separated was fed under a pressure of 0.5 kg/cm$^2$, and the oil-coalescing separation of the oil-water mixture was carried out. The direction of the liquid feed was the reverse of that adopted in Example 3. Namely, the liquid to be separated was fed from the opening 13 in FIG. 3 and the permeated liquid after the coalescing separation treatment was withdrawn from the opening 11. Kerosene recovered by the coalescing separation was withdrawn from the oil trap valve 19.

The obtained results are shown in Table 14.

TABLE 14

|  | After Permeation of 10 l | After Permeation of 30 l | After Permeation of 80 l |
| --- | --- | --- | --- |
| Run 19 |  |  |  |
| Oil concentration* (ppm) after oil-coalescing separation | 5 | 4 | 4 |
| Permeation rate (l/min · m²) | 750 | 700 | 680 |

Note
*The oil concentration in the treated liquid withdrawn from the opening 11 in FIG. 3 was measured.

From the results shown in Table 14, it is seen that according to the oil-coalescing separation method using the nonwoven fabric of the present invention, the coalescing separation could be accomplished at a high permeation rate and a high precision.

EXAMPLE 11

A liquid prepared under conditions described below was subjected to the oil-coalescing separation test by using the same nonwoven fabric and apparatus under the same conditions as described in Example 10.

Liquid to Be Separated:

To 50 l of 2,2,2-trifluoroethanol was added 50 cc of a turbine oil (P-32 supplied by Idemitsu Kosan), and the mixture was stirred for 20 minutes by a mixer. The oil concentration in the oil droplet-dispersed phase was 410 ppm and the size of the oil droplets was 0.5 to 2.0 μm. The oil concentration was determined by using a gas chromatograph supplied by Shimazu.

The obtained results are shown in Table 15.

TABLE 15

|  | After Permeation of 10 l | After Permeation of 30 l |
| --- | --- | --- |
| Oil Concentration* (ppm) after Coalescing Separation | 3 | 4 |
| Permeation Rate (l/min · m²) | 740 | 690 |

Note
*The oil concentration was determined in the same manner as described in Example 10.

As is apparent from the results shown in Table 15, according to the coalescing separation method using the nonwoven fabric of the present invention, a high coalescing separation capacity could be attained.

EXAMPLE 12

A liquid prepared under conditions described below was subjected to the coalescing separation test by using the same nonwoven fabric and apparatus under the same conditions as described in Example 10. The obtained results are shown in Table 16.

Liquid to Be Separated:

To 100 l of distilled water was added 100 cc of toluene, and the mixture was circulated for 30 minutes through a swirl pump to obtain an oil-water mixture in which toluene was dispersed in water. The oil concentration in the oil droplet-dispersed portion was 290 ppm and the size of the oil droplets was 0.5 to 2.0 μm.

TABLE 16

|  | After Permeation of 10 l | After Permeation of 50 l | After Permeation of 80 l |
| --- | --- | --- | --- |
| Oil Concentration* (ppm) after Coalescing Separation | 5 | 5 | 4 |
| Permeation Rate (l/min · m²) | 760 | 740 | 700 |

Note
*The oil concentration was determined in the same manner as described in Example 10.

As is apparent from the results shown in Table 16, according to the coalescing separation method using the nonwoven fabric of the present invention, a high coalescing separation capacity could be attained.

EXAMPLE 13

By using the water-repellent-treated nonwoven fabrics of samples 1 through 15 prepared in Examples 1 and 2, two-layer fabric structures were formed in a manner as described below. With respect to each of the fabrics, the air permeability, the softness and the washing durability of the water pressure index were determined.

Front Fabric:

A 75-denier/36-filament polyethylene terephthalate yarn was formed into an interlock knitted fabric having a basis weight of 200 g/m² by a circular knitting machine, and the knitted fabric was dyed according to customary procedures.

A polyamide hot-melt adhesive (Platamide H/02P supplied by Nippon Rylsan) was dot-applied to one surface of the knitted fabric at a density of 100 points per square inch so that the amount of the adhesive applied was 5 g/m². The resin-sticking treatment was conducted at 180° C. for 15 seconds in an air drier to form a front fabric for a two-layer fabric, which had an air permeability of 150 cc/cm².sec.

Bonding:

The nonwoven fabric was piled on the front fabric and bonded thereto under a pressure of 3 kg/cm² at 140° C. for 20 seconds by using a heat-pressing machine.

The results of the evaluation of the properties of the thus-obtained two-layer fabrics are shown in Table 17.

TABLE 17

| Sample No. of Nonwoven Fabric | Air Permeability (cc/cm² · sec) | Softness (class) | Water Pressure Resistance Index (mmH₂O) | | Remarks |
| --- | --- | --- | --- | --- | --- |
|  |  |  | just after preparation | after repeating washing 30 times |  |
| 1 | 0.5 | 1 | 1,170 | 1,020 | Comparison |
| 2 | 1.0 | 1 | 950 | 880 | Present invention |
| 3 | 3.0 | 1 | 840 | 790 | Present invention |
| 4 | 5.1 | 1 | 610 | 590 | Present invention |

TABLE 17-continued

| Sample No. of Nonwoven Fabric | Air Permeability (cc/cm² · sec) | Softness (class) | Water Pressure Resistance Index (mmH₂O) | | Remarks |
|---|---|---|---|---|---|
| | | | just after preparation | after repeating washing 30 times | |
| 5 | 7.3 | 2 | 520 | 500 | Present invention |
| 6 | 8.7 | 2 | 410 | 400 | Present invention |
| 7 | 10.1 | 2 | 300 | 280 | Comparison |
| 8 | 11.0 | 3 | 210 | 190 | Comparison |
| 9 | 28 | 1 | 150 | 120 | Comparison |
| 10 | 23 | 1 | 180 | 150 | Comparison |
| 11 | 15 | 1 | 650 | 630 | Present invention |
| 12 | 5 | 2 | 860 | 820 | Present invention |
| 13 | 1 | 3 | 1,300 | 1,230 | Present invention |
| 14 | 0.5 | 3 | 1,950 | 1,810 | Comparison |
| 15 | 0.5 | 3 | 2,240 | 2,090 | Comparison |

From the results shown in Table 17, it is seen that when samples 2 through 6 and 11 through 13 of the present invention were used, a water pressure resistance index of at least 400 mmH$_2$O was attained at an air permeability of at least 1.0 cc/cm$^2$.sec

EXAMPLE 14

The nonwoven fabric of sample 3 obtained in Example 1 was subjected to the relaxing and water-repellent treatments under conditions described below. As the result, there was obtained a nonwoven fabric excellent in the softness, which had an air permeability of 10 cc/cm$^2$.sec, a water pressure resistance index of 750 mmH$_2$O and a fiber packing ratio of 14%.

Relaxing Treatment:

Winch dyeing machine, temperature of 60° C., fabric speed of 20 m/min, time of 60 minutes, bath ratio of 1/50

Dehydrating Treatment:

Centol dehydrator, time of 30 seconds

Drying Treatment:

Heat-setting machine, temperature of 120° C., time of 2 minutes

Water-Repellent Treatment:

The sample was immersed in a mixed aqueous solution comprising 3 parts by weight of a water repellent (Asahi Guard AG710 supplied by Asahi Glass), 1 part by weight of an antistatic agent (Eletat 930 supplied by Ipposha), 2 parts by weight of isopropanol as a penetrant and 94 parts by weight of water, and the sample was dehydrated at a squeeze ratio of 100% by a mangle and heat-treated at 180° C. for 60 seconds.

Furthermore, the surface knit fabric was bonded to the nonwoven fabric under the same conditions as described in Example 13, and the durability against washing was tested in the same manner as in Example 13. The air permeability was 14.0 cc/cm$^2$.sec and the water pressure resistance index was 730 mmH$_2$O. Accordingly, it was confirmed that the properties were not changed by washing.

EXAMPLE 15

A polyamide hot-melt adhesive (Platamide H/02P supplied by Nippon Rylsan) was dot-applied to one surface of the nonwoven fabric having an air permeability of 10 cc/cm$^2$.sec and a water pressure resistance index of 750 mmH$_2$O, which was obtained in Example 14, at a density of 100 dots/inch$^2$ so that the amount of the adhesive applied was 5 g/m$^2$. A tricot satin fabric of a 50-denier/48-filament polyethylene terephthalate yarn having a basis weight of 120 g/m$^2$ was piled on the adhesive-applied nonwoven fabric and they were bonded together by a heat calender machine maintained at 140° C. The two-layer fabric obtained as the back fabric was laminated and integrated with a circular interlock knitted fabric of a 150-denier/48-filament polyethylene terephthalate yarn having a basis weight of 200 g/m$^2$ by sewing only the edge portions of the fabrics to form a diaper cover.

For comparison, a similar three-layer structure was formed by applying the hot-melt adhesive to both surfaces of the nonwoven fabric and bonding the knitted fabrics thereto. Both products were compared with respect to touch and durability of the water pressure resistance after repeating washing 50 times. As the result, it was found that surface roughening of the nonwoven fabric could be prevented by laminating the knitted fabrics on both the front and back surfaces, reduction of the water pressure resistance did not occur, and that the surface laminated with the knitted fabric by sewing had a softer touch.

In each of the laminated structures comprising the two-layer structure and the front fabric and the three layer-integrated structure, the water pressure resistance index was 720 mmH$_2$O and the air permeability was 13.0 cc/cm$^2$.sec, and it was confirmed that the properties were not changed.

EXAMPLE 16

A taffeta comprising 190 nylon yarns (having a basis weight of 45 g/m$^2$ and an air permeability of 18 cc/cm$^2$.sec) was bonded to the nonwoven fabric having an air permeability of 10 cc/cm$^2$.sec and a water pressure resistance index of 750 mmH$_2$O, which was obtained in Example 14, by using a gravure coating machine under conditions described below to obtain a two-layer fabric having an air permeability of 4.5 cc/cm$^2$.sec and a water pressure resistance index of 780 mmH$_2$O.

Gravure Coating Treatment:

By using a gravure coating machine, a polyurethane adhesive (Crysbon NT-150 supplied by Dainippon Ink) was dot-applied at 50 dots/inch$^2$ and 7 mm$^2$/dot to a release paper having the surface treated with polypropylene, so that the applied of the adhesive amount was 10 g/m$^2$. The nylon woven fabric was placed on the coated surface and the assembly was pressed under a pressure of 300 g/m$^2$ to effect bonding. Then, the release paper was peeled, the nonwoven fabric was piled on the nylon fabric, and the solvent of the polyurethane adhesive was removed by heating. The bonded structure was wound in the form of a roll.

A raincoat was prepared by using this fabric as a front fabric and wearing tests were conducted. It was found that the stuffy feeling was much reduced as compared with a raincoat formed by using a conventional coated fabric having no air permeability. The wearing conditions were as follows and the results are shown in Table 18.

Wearing Conditions:

(1) Environment: temperature of 20° C. and relative humidity of 60%

(2) Wearing method: long-sleeved underwear composed completely of cotton was worn next to the skin and a water-proof fabric worn thereover (3) Exercise: stamping was conducted at a frequency of 112 times per minute for 60 minutes after the rest time of 5 minutes after wearing, and a rest time of 15 minutes was taken after exercise (4) Measurement: the temperature and humidity between the skin and the underwear were measured at intervals of 5 minutes, and the amount of sweat formed during wearing was determined based on the increase of the weight of the underwear.

TABLE 18

| | | Fabric of Present Invention | | Coated Fabric | |
|---|---|---|---|---|---|
| | | Temperature (°C.) | Relative Humidity (%) | Temperature (°C.) | Relative Humidity (%) |
| Rest | 5 minutes | 28.3 | 44.0 | 28.0 | 45.0 |
| Exercise | 5 minutes | 28.7 | 40.0 | 28.7 | 46.0 |
| " | 10 minutes | 28.8 | 41.0 | 29.3 | 47.0 |
| " | 15 minutes | 28.8 | 42.0 | 29.8 | 55.0 |
| " | 20 minutes | 28.8 | 43.0 | 29.9 | 56.0 |
| " | 25 minutes | 29.0 | 43.0 | 30.0 | 57.0 |
| " | 30 minutes | 29.1 | 42.0 | 30.1 | 57.0 |
| " | 35 minutes | 29.0 | 42.0 | 30.0 | 58.0 |
| " | 40 minutes | 29.0 | 43.0 | 30.0 | 58.0 |
| " | 45 minutes | 29.0 | 43.0 | 30.1 | 58.0 |
| " | 50 minutes | 29.1 | 43.0 | 30.2 | 58.0 |
| " | 55 minutes | 29.1 | 43.0 | 30.2 | 58.0 |
| " | 60 minutes | 29.0 | 43.0 | 30.2 | 58.0 |
| Rest | 5 minutes | 28.8 | 42.0 | 30.2 | 58.0 |
| " | 10 minutes | 28.5 | 41.0 | 29.8 | 58.0 |
| " | 15 minutes | 28.3 | 41.0 | 29.3 | 57.0 |
| Amount of Sweat (g/underwear) | | 18 | | 50 | |

EXAMPLE 17

The nonwoven fabric prepared in Example 15, which had an air permeability of 10 cc/cm$^2$.sec and a water pressure resistance index of 750 mmH$_2$O and to which the hot-melt adhesive and dot-applied, was heat-bonded to the inner side of a leather shoe in which holes having a diameter of 1 mm were formed at a density of 20 holes/inch$^2$ in the instep portion to form a golf shoe.

By using the thus-prepared golf shoe, foot-stamping was performed at a frequency of 112 times per minute for 30 minutes in an atmosphere maintained at a temperature of 30° C. and a relative humidity of 60%, and changes of the temperature and humidity in the shoe were observed. In the shoe having holes, the temperature was 35.0° C. and the relative humidity was 93%, and in the shoe having no holes, the temperature was 36.5° C. and the relative humidity was 98%. The wearing feel was comfortable in the shoe having holes.

When the shoe having holes was immersed in water for a whole day and night, the intrusion of water was not observed. Thus, it was found that the product was an all-weather shoe in which the stuffy feeling was much reduced as compared with a hole-free shoe and permeation of water into the shoe by rain or pieces of wet grass was prevented.

EXAMPLE 18

The hot-melt adhesive resin-applied, air-permeable water-proof nonwoven fabric prepared in Example 15 was bonded to a woven fabric of a 50-denier/24-filament false-twisted polyethylene terephthalate yarn having a basis weight of 45 g/m$^2$ to obtain a two-layer fabric having an air permeability of 3 cc/cm$^2$ sec. Ski wear (coat and trousers) was prepared from this two-layer fabric and compared with a vinyl-coated product, a fine porous film-bonded product and a product formed from a high-density woven fabric. It was found that in the case of the comparative products, the air permeability was lower than 1 cc/cm$^2$.sec and air between the cloth and the body did not move at the time of physical exercise or air caused bulging or the cloth adhered closely to the body to reduce the appearance characteristic. In contrast, in the case of the product of the present invention, air between the cloth and the body moved appropriately according to the motion f the body and no discomfortable was felt while the product was worn.

EXAMPLE 19

When the strength and elongation of the hot-melt adhesive resin-applied nonwoven fabric prepared in Example 15, which had an air permeability of 10 cc/cm$^2$.sec and a water pressure resistance index of 750 mmH$_2$O, were measured, it was found that the strength and elongation were 1,050 g/inch of the width and 23% in the warp direction, 1,100 g/inch of the width and 25% in the weft direction and 1,120 g/inch of the width and 27% in the oblique direction, respectively. It was considered that these strength and elongation characteristics were insufficient in the field of clothing. Accordingly, a back-half tricot knit texture was formed at 80 courses/inch by using a 30-denier/12 filament polyethylene terephthalate yarn on a tricot 32G machine, dyed according to customary procedures, and then finally set by using a pin tenter to change the balances of strength and elongation in the weft and warp directions. The thus-formed front fabric and the above nonwoven fabric were then piled and bonded together by using a heat-pressing machine to form a two-layer fabric. The strength and elongation of the tricot fabric and the two-layer fabric were measured, and pulling under 2 kg/inch of the width was repeated 50 times and the water pressure resistance index was measured. The obtained results are shown in Table 19. From the results shown in Table 19, it is seen that even if the strength and elongation were improved to practically satisfactory levels by bonding the tricot fabric having sufficient strength and elongation to the nonwoven fabric, the water pressure resistance index was not reduced.

TABLE 19

| Sample | Strength (g/inch) of Tricot Fabric | | Strength and Elongation of Bonded Two-Layer Fabric | | | Water Pressure Resistance Index (mmH$_2$O) after Repeated Pulling |
| --- | --- | --- | --- | --- | --- | --- |
| | at 25% elongation | at break | elongation (%) under load of 2 kg | strength (g/inch) at break | elongation (%) at break | |
| G-1 | | | | | | |
| Warp direction | 0.8 | 12.5 | 45 | 12.8 | 65 | Broken |
| Weft direction | 0.7 | 21.0 | 32 | 22.0 | 52 | |
| G-2 | | | | | | |
| Warp direction | 2.2 | 12.8 | 17 | 13.0 | 32 | 700 |
| Weft direction | 2.3 | 22.3 | 20 | 22.0 | 28 | |
| G-3 | | | | | | |
| Warp direction | 4.8 | 10.8 | 12 | 12.2 | 25 | 730 |
| Weft direction | 5.7 | 19.5 | 20 | 19.9 | 21 | |

EXAMPLE 20

The hot-melt adhesive resin-applied nonwoven fabric obtained in Example 15 was bonded to a Tarpaulin woven fabric comprising a 420-denier/48-filament polyamide yarn and having a basis weight of 120 g/m$^2$ by using a hot calender machine to obtain a two-layer fabric. A swimsuit bag was prepared from this fabric. When a wet swimsuit was contained in this bag, water coming out from the swimsuit did not leak outside of the bag and a bad smell was not generated in the contained swimsuit.

EXAMPLE 21

When a side wall of an outdoor tent was prepared by using the two-layer fabric obtained in Example 20, the freezing of steam condensation in the tent, which ordinarily occurs in the cold weather, did not occur at all.

EXAMPLE 22

A hat was prepared from the two-layer fabric obtained in Example 20. No stuffy feeling was felt in the interior of the hat.

EXAMPLE 23

The nonwoven fabric of Sample 3 obtained in Example 1 was subjected to a calender treatment under the embossing conditions described below and was then subjected to the relaxing and water-repellent treatments in the same manner as described in Example 14 to obtain a nonwoven fabric having an excellent softness, which had an air permeability of 8 cc/cm$^2$.sec, a water pressure resistance index of 780 mmH$_2$O, and an average fiber pack ratio of 23%. The strength of this nonwoven fabric was compared with the strength of the non-embossed woven fabric of Example 14 by using a uniform abrasion tester of JIS L-1018. The non-embossed fabric was broken after 712 abrasions, but the embossed fabric was broken after 1,807 abrasions. Accordingly, it was found that the shape-retaining property could be improved by the embossing treatment.

| Abrasion Strength (times) | |
| --- | --- |
| Embossed Fabric | Non-embossed Fabric (Example 14) |
| 1,807 | 712 |

Embossing Conditions:

The upper roll was a dotted roll of iron having dots arranged at a density of 100 dots/inch$^2$ and an area ratio of 8%, and the lower roll was a plain roll of iron. The pressing pressure was 45 kg/cm, the processing speed was 10 m/min, and the processing temperature was 100° C.

EXAMPLE 24

The nonwoven fabric of Sample 3 obtained in Example 1 was sufficiently immersed in water at 40° C. by using a winch dyeing machine, and fabric was crumpled, and the temperature was elevated to 80° C. to shrink the fabric by an area ratio of 20%. Then, the fabric was dehydrated and dried to obtain a nonwoven fabric having an air permeability of 12 cc/cm$^2$.sec and a fiber packing ratio of 14%. A polyester hot-melt adhesive resin (#440 supplied by Asahi Kasei) was dot-applied to one surface of this nonwoven fabric at a density of 100 dots/inch$^2$ so that the amount of the hot-melt adhesive resin applied was 10 g/m$^2$. A woven fabric comprising a 70-denier/24-filament nylon yarn as a warp and an 80-denier/21-filament cotton yarn as a weft and having a basis weight of 80 g/m$^2$ was piled on the above nonwoven fabric and they were heat-bonded together at 140° C. under a pressure of 33 kg/cm. The obtained product had a bad touch and non commercial value. Accordingly, the product was immersed in water at 40° C. and crumpled for 60 minutes in a washer dyeing machine to soften the product. The rigidity-softness was measured by the cantilever method. The obtained value was 12 cm in the case of the product which had not been subjected to the crumpling treatment, but the value was 5 cm in the case of the crumpled product. Thus, a two-layer fabric having a sufficient softness was obtained. Then, the surface fabric and nonwoven fabric of this two-layer fabric were simultaneously subjected to the water-repellent treatment under the same conditions as described in Example 14. The water repellency was 100 points as determined by using a spray type water repellency tester of JIS L-1018, and the resulting two-layer fabric had a water pressure resistance index of 860 mmH$_2$O and an air permeability of 5.8 cc/cm$^2$.sec. The rigidity-softness of the fabric was 5.5 cm as determined by the cantilever method, and the crumpling effect by the washer dyeing machine was retained.

EXAMPLE 25

A polybutylene terephthalate chip having an intrinsic viscosity of 0.65 was melted in an extruder and fed into a die (see FIG. 1) heated at 290° C. The melt was extruded into a high-speed stream of steam maintained at a temperature of 330° C. and a pressure of 3.5 kg/cm$^2$ from 1,500 orifices each having a diameter of 0.3 mm, which were arranged in a line at a pitch of 1 mm. The extrusion rate was 0.07 g/min/orifice. Thus, a nonwoven fabric comprising filaments having an average single filament denier of 0.02 and having a fiber packing ratio of 14%, a thickness of 0.33 mm, and a basis weight of 50 g/mm$^2$ was prepared according to the melt-blow method.

The obtained nonwoven fabric was subjected to the water-repellent treatment under the same conditions as described in Example 14 to obtain a nonwoven fabric having an air permeability of 8.0 cc/cm$^2$.sec, a water pressure resistance index of 1000 mmH$_2$O, and a fiber packing ratio of 18%. The nonwoven fabric was bonded to the surface knitted fabric under the same conditions as described in Example 15, and when the durability against washing was tested in the same manner as described in Example 15, it was found that the water pressure resistance index wa 980 mmH$_2$O. Thus, it was confirmed that the fabric had sufficient durability.

We claim:

1. A water-repellent nonwoven fabric comprising a melt-blown fiber having a single filament denier of 0.005 to 2.0, wherein the fiber packing ratio is 5 to 70% and the water pressure resistance index is 400 to 2,000 mmH$_2$O.

2. A water-repellent nonwoven fabric according to claim 1, wherein the melt-blown fiber has a single filament denier of 0.005 to 1.0.

3. A water-repellent nonwoven fabric according to claim 1 wherein the melt-blown fiber has a single filament denier of 0.01 to 0.5.

4. A water-repellent nonwoven fabric according to claim 1 wherein the nonwoven fabric has a fiber packing ratio of 5 to 30% and an air permeability of at least 1.0 cc/cm$^2$.sec 5. A water-repellent nonwoven fabric according to claim 1 wherein the nonwoven fabric has a fiber packing ratio of 10 to 50%.

6. A water-repellent nonwoven fabric according to claim 1 wherein the nonwoven fabric has a fiber packing ratio of 15 to 40%.

7. An oil-water separating filter having a permeability to oil and a non-permeability to water, which comprises a nonwoven fabric made of a melt-blown fiber having a single filament denier of 0.005 to 2.0, said nonwoven fabric having a fiber packing ratio of 5 to 70% and a water pressure resistance index of 400 to 2,000 mmH$_2$O.

8. An oil-water separating filter according to claim 7 wherein said nonwoven fabric has a fiber packing ratio of 10 to 50%.

9. An oil-water separating filter according to claim 7 wherein said nonwoven fabric has a fiber packing ratio of 15 to 40%.

10. An oil-water separating filter according to claim 7 which further comprises a liquid-permeable sheet which is laminated on at least one surface of the nonwoven fabric.

11. An oil-water separating filter according to claim 10 wherein the liquid-permeable sheet is a mesh structure of a metal or a woven fabric of a synthetic fiber.

12. A composite fabric comprising a water-repellent nonwoven fabric and an air-permeable knitted or woven fabric laminated and integrated with at least one surface of said nonwoven fabric, said nonwoven fabric being made of a melt-blown fiber having a single filament denier of 0.005 to 2.0 and said nonwoven fabric having a fiber packing ratio of 5 to 70% and a water pressure resistance index of 400 to 2,000 mmH$_2$O.

13. A composite fabric according to claim 12 wherein the melt-blown fiber has a single filament denier of 0.005 to 1.0.

14. A composite fabric according to claim 12 wherein the nonwoven fabric has a fiber packing ratio of 5 to 30% and an air permeability of at least 1.0 cc/cm$^2$.sec.

15. A composite fabric according to claim 12 wherein the air-permeable knitted or woven fabric exhibits a stress of at least the value A defined by the following equation, when said knitted or woven fabric is elongated at the elongation at break of the nonwoven fabric:

A=(2.0 kg/2.5 cm)—(the maximum stress value attained when the nonwoven fabric is elongated).

* * * * *